Dec. 24, 1935.  A. D. PETTEE  2,025,670
RESERVOIR
Filed Sept. 6, 1930
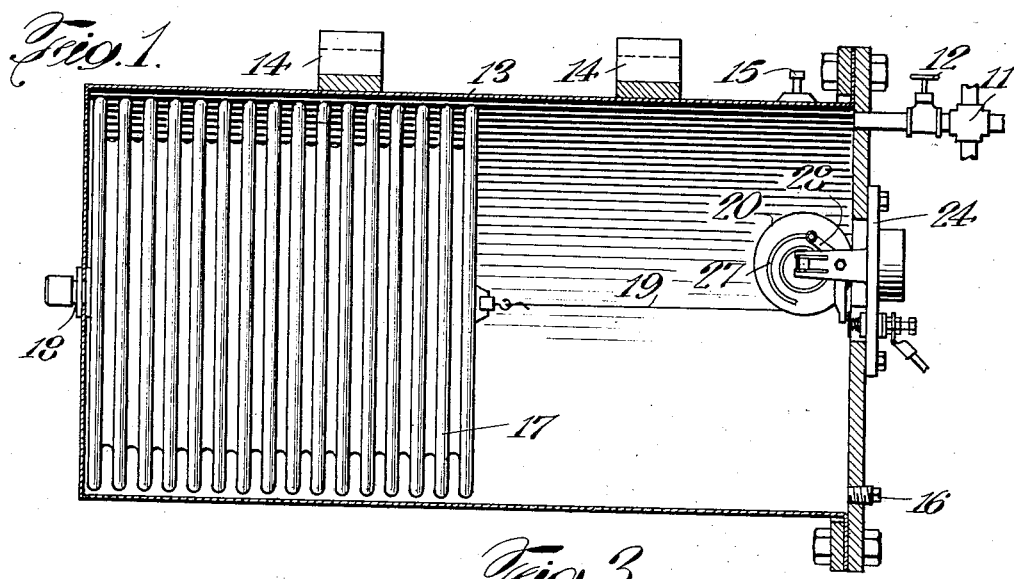
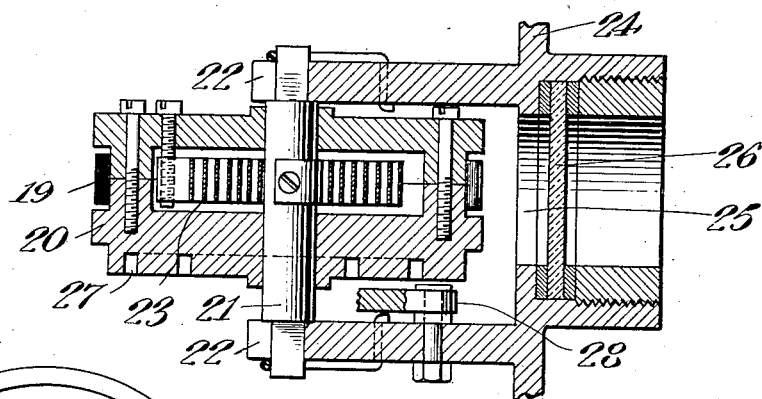
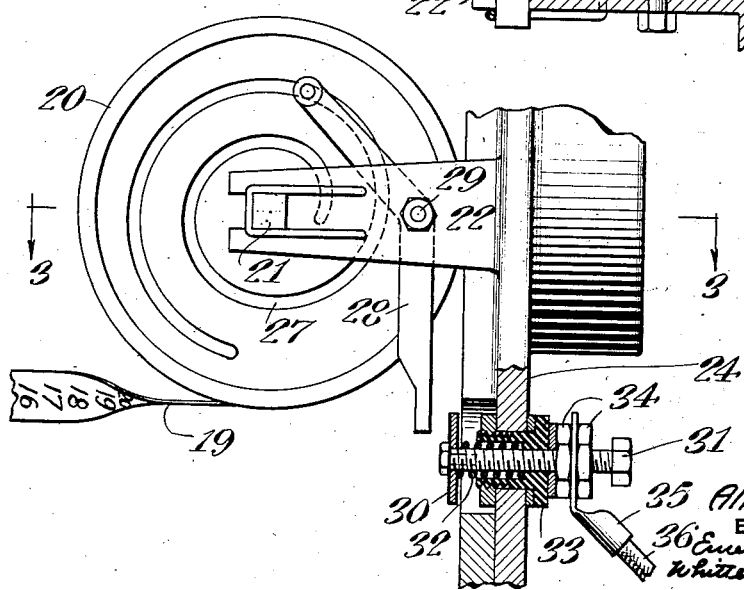
INVENTOR
Allen D. Pettee
BY
Emery, Booth, Varney &
Whittemore
ATTORNEYS Patented Dec. 24, 1935

2,025,670

UNITED STATES PATENT OFFICE 2,025,670

RESERVOIR

Allen D. Pettee, Mount Vernon, N. Y., assignor to General Cable Corporation, New York, N. Y., a corporation of New Jersey Application September 6, 1930, Serial No. 480,139

6 Claims. (Cl. 177—311)

This invention relates to apparatus for use with electrical equipment and installations wherein it is desired to maintain continuously and under varying conditions a supply of liquid insulation under pressure. It is an object of the invention to provide improved apparatus of the character described. Other objects and advantages of the invention will appear hereinafter.

The nature and objects of the invention will be better understood from a description of a particular embodiment thereof, and for the purpose of such description reference should be had to the accompanying drawing forming a part hereof, and in which:

Fig. 1 is a view largely in longitudinal section of a reservoir for supplying liquid insulation under pressure to electrical apparatus;

Fig. 2 is an elevation to enlarged scale of the gauge for giving an indication of the volume of liquid insulation within the reservoir; and Fig. 3 is a sectional view through the gauge substantially on the line 3—3 of Fig. 2.

In electrical equipment and installations containing liquid insulation the volume of the liquid insulation varies due to the expansion and contraction thereof caused by temperature changes. These temperature changes may arise either from climatic conditions or from changing conditions of operation. Unless the variation in volume of the liquid insulation is compensated for in some manner, the enclosing casing may be stretched or ruptured during expansion, and voids may be formed in the insulation during contraction. It has been proposed to maintain continuously the integrity of the liquid insulation in such apparatus by connecting to the apparatus a variable volume reservoir filled with liquid insulation which is maintained under pressure.

Conveniently, the liquid insulation can be maintained under pressure by providing the reservoir with a flexible wall, and by providing suitable means for exerting pressure against the outer surface of the flexible wall. Since it is desired to maintain at all times the continuity and integrity of the liquid insulation within the electrical apparatus it is important that the reservoir have means whereby the volume of liquid insulation within the reservoir may readily be observed. The provision of such means will permit the recharging of a reservoir with liquid insulation before the volume therein is reduced to a dangerously low value.

The means ordinarily used for exerting pressure against the flexible wall of the reservoir of the type described prevents ready observation of the flexible wall, making it difficult, if not impossible, to ascertain when the reservoir needs refilling. This is particularly true where the pressure is exerted on the flexible wall by means of a body of gas under pressure, which type of construction commonly includes a gas-tight chamber secured to the reservoir and enclosing the flexible wall. This invention contemplates an improved reservoir for supplying liquid insulation under pressure to electrical apparatus, and improved means permitting ready observation of the instantaneous volume of liquid insulation within the reservoir.

Referring to the drawing, and first to Fig. 1, 11 represents a manifold connected by means of piping with electrical apparatus, (not shown) filled with liquid insulation. The manifold is connected through a valve 12 to a reservoir 13 for supplying liquid insulation to the manifold 11, and through the piping to the electrical apparatus. Conveniently, the reservoir may be supported on the wall or ceiling of a manhole, as by means of the brackets 14. Liquid insulation may be supplied to the reservoir 13 through a suitable inlet opening 15, which preferably will be provided with a one-way valve mechanism. Desirably a drain plug 16 is provided whereby the reservoir may be drained of its liquid insulation.

Within the reservoir 13 is a flexible partition 17 dividing the container into two compartments. Conveniently, this flexible partition may take the form of a longitudinally expansible and collapsible corrugated tubular member which, for convenience, will be referred to as a bellows. This bellows may, for example, be made of thin sheet steel which is covered or coated with lead. The bellows 17 is rigidly secured to one end of the container 13, and a gas inlet opening 18 to the interior of the bellows passes through the wall of the chamber 13. Conveniently, this gas inlet opening is provided with a check valve generally similar to the valves used in automobile tires.

It will be apparent from the description thus far that a reservoir for liquid insulation is provided wherein the volume of the liquid insulation compartment of the reservoir may change to compensate for changes in the volume of the liquid insulation within the electrical apparatus to which the reservoir is connected, and wherein the liquid insulation may be maintained continuously under pressure. As the volume of liquid insulation within the electrical apparatus varies, liquid insulation flows either into or out of the reservoir, and the bellows 17 contracts or expands accordingly.

Referring to the drawing it will be seen that the movable end of the bellows 17 has secured thereto one end of a tape 19, the other end of the tape being connected to a suitable take-up device secured against movement relative to the wall of the reservoir 13. Desirably the tape 19 will be of metal, and will have along its length a series of graduations which may be calibrated to furnish a direct visual indication of the actual volume of liquid insulation within the reservoir.

Conveniently, the take-up device for the tape 19 comprises a spring-actuated reel 20. In the illustrative embodiment the reel is rotatably mounted on a shaft 21 which is secured against rotation in brackets 22 projecting angularly from a head plate 24 secured in an opening in one wall of the reservoir 13. As will be seen in Fig. 3, the reel 20 is connected to the shaft 21 by means of a helical spring 23 generally similar to the main spring in a clock. The end of a tape 19 is secured on the periphery of the reel 20, and the spring 23 is adjusted so that the tape 19 is wound on the reel to maintain the tape taut at all times, while permitting reeling and unreeling of the tape as the bellows 17 expands and contracts.

The head plate 24 has an aperture 25 which is sealed with a glass 26. The opening 25 is positioned with respect to the reel 20 in such a manner that a portion of the reel 20 is visible through the glass 26, so that an observation may be made of the graduations on the tape 19 at a point immediately in the rear of the glass 26. This arrangement permits a direct visual observation of the amount of the tape 19 which is wound upon the reel 20, thereby giving an accurate indication of the volume of liquid insulation within the reservoir.

Desirably means are provided for giving a warning signal when the volume of liquid insulation within the reservoir is reduced to a predetermined low value. Conveniently, such signal may be electrically operated, and in the illustrative embodiment an electric switch is closed when the volume of liquid insulation is reduced to the predetermined value. This electric switch may be in the circuit of a suitable signal device, which device may be located near the reservoir, or at some distant point such as a central station.

Referring to the drawing on one side of the reel 20 is a spiral groove 27 within which a follower mounted on one end of an angular switch arm 28 is adapted to slide. The switch arm 28 is pivotally mounted at 29 on the bracket 22. Rotation of the reel 20 causes the switch arm 28 to turn about its pivot 29, either to the right or left depending upon the direction of rotation of the reel, which direction of rotation is determined by whether the volume of liquid insulation within the reservoir is increasing or decreasing. In the illustrative embodiment a decrease in the volume of the liquid insulation compartment permits the reel 20 to turn under the influence of the spring 23 to the left. As the reel 20 turns to the left the switch arm 28 is turned to the left, and the end of the switch arm opposite the follower is moved into engagement with an electrical contact 30. Desirably, the switch arm 28 engages the contact 30 before the liquid insulation within the reservoir is completely exhausted, so that after the warning signal has been given there will be time to permit recharging the reservoir with liquid insulation.

As may be seen in Fig. 2, the contact 30 may be slidably mounted on a screw 31, and pressed outwardly toward the end of the screw as by means of a spring 32. The screw 31 is electrically insulated from the reservoir casing, as by means of the insulating bushing 33, and desirably the screw 31 is longitudinally adjustable in the bushing so as to permit control of the time at which the warning signal is operated. As shown, the bushing 33 is interiorly screwthreaded, whereby the screw 31 may be adjusted longitudinally of the bushing by turning movement, and the screw may be secured in adjusted position as by means of the lock nuts 34. A terminal lug 35 may be connected between the lock nuts, which terminal lug is connected through a lead 36 to the signal device. Ordinarily, the outer casing of the oil reservoir will be metal, and preferably will be grounded. If such is the case the return circuit from the signal device may be through the ground. If desired, a wire return circuit may be provided, such wire return circuit connecting to the switch arm 28, in any suitable manner, as through the mounting 29, bracket 22, and head plate 24.

It will be apparent that this invention provides an improved reservoir for supplying liquid insulation to electrical apparatus, which reservoir has a gauge for giving a visual indication of the volume of liquid insulation within the reservoir, and which conveniently may be provided with a signal device for giving a warning when the volume of liquid insulation within the reservoir reaches a dangerously low value.

While the invention has been described with particular reference to the illustrative embodiment, it will be understood that the invention may be variously modified and embodied within the scope of the claims.

I claim:

1. In a variable capacity reservoir for supplying liquid insulation under pressure to electrical apparatus, the combination of a tight-walled container divided interiorly into compartments by a flexible partition, means for supplying liquid insulation to the compartment on one side of said partition, means for supplying gas under pressure to the compartment on the other side of said partition, a spring-actuated reel mounted on the wall of said container, a tape secured at one end to said flexible partition and at its other end on the periphery of said reel, graduations on said tape, and means adjacent said reel permitting observation of said graduations whereby the volume of liquid insulation within the container may readily be ascertained.

2. In a variable capacity reservoir for supplying liquid insulation under pressure to electrical apparatus, the combination of a tight-walled container for liquid insulation, said container having a flexible wall permitting variation in the volume of the container, means for exerting pressure on said flexible wall tending to reduce the volume of said container, means enclosing said pressure exerting means and preventing direct observation of the flexible wall, a spring actuated reel mounted on said second mentioned means, a tape secured at one end to said flexible wall and at its other end to said reel, graduations on said tape, and means permitting observation of said graduations whereby the volume of the liquid insulation container at any instant may readily be ascertained.

3. In a variable capacity reservoir for supplying liquid insulation under pressure to electrical apparatus, the combination of a tight-walled container for liquid insulation, said container having a flexible wall permitting variation in the volume of the container, means for exerting pressure on said flexible wall tending to reduce the volume of said container, a take-up device mounted in fixed position relative to said container, a tape secured at one end to said flexible wall and at the other end to said take-up device whereby more or less of the tape is taken up by said device as the volume of the container changes, and graduations on said tape whereby the volume of the container may be ascertained by an observation of the amount of tape taken up by said device.

4. In a variable capacity reservoir for supplying liquid insulation under pressure to electrical apparatus, the combination of a tight-walled container for liquid insulation, said container having a flexible wall permitting variation in the volume of the container, means for exerting pressure on said flexible wall tending to reduce the volume of said container, a take-up device mounted in fixed position relative to said container, a tape secured at one end to said flexible wall and at the other end to said take-up device whereby more or less of the tape is taken up by said device as the volume of the container changes, and means operatively controlled by said take-up device for closing an electrical circuit when a predetermined amount of tape has been taken up by said device.

5. In a variable capacity reservoir for supplying liquid insulation under pressure to electrical apparatus, the combination of a tight-walled container for liquid insulation, said container having a flexible wall permitting variation in the volume of the container, means for exerting pressure on said flexible wall tending to reduce the volume of said container, a take-up device mounted in fixed position relative to said container, a tape secured at one end to said flexible wall and at the other end to said take-up device whereby more or less of the tape is taken up by said device as the volume of the container changes, means actuated by said take-up device for closing an electrical circuit when a predetermined amount of tape has been taken up by said device, and means for giving an alarm upon the closure of the electrical circuit.

6. In a variable capacity reservoir for supplying liquid insulation under pressure to electrical apparatus, the combination of a tight-walled container for liquid insulation, said container having a flexible wall permitting variation in the volume of the container, means for exerting pressure on said flexible wall tending to reduce the volume of said container, means enclosing said pressure exerting means and preventing direct observation of the flexible wall, a spring actuated reel mounted on said second mentioned means, a tape secured at one end to said flexible wall and at its other end to said reel, an electrical contact, a switch arm, and means connecting said switch arm with said reel whereby rotation of the reel moves said switch arm toward or away from said contact and completes an electrical circuit when the volume of said container reaches a predetermined value.

ALLEN D. PETTEE.